United States Patent [19]

Kelm

[11] Patent Number: 5,632,523

[45] Date of Patent: *May 27, 1997

[54] DEVICE FOR ADJUSTING THE POSITION OF A SLIDING ROOF COVER

[75] Inventor: Eckehart Kelm, Gilching, Germany

[73] Assignee: Rolf Farmont, Germany

[*] Notice: The term of this patent shall not extend beyond the expiration date of Pat. No. 5,447,355.

[21] Appl. No.: 664,812

[22] Filed: Jun. 17, 1996

Related U.S. Application Data

[63] Continuation of Ser. No. 518,389, Aug. 23, 1995, abandoned, which is a continuation of Ser. No. 197,136, Feb. 17, 1994, Pat. No. 5,447,355.

[30] Foreign Application Priority Data

Feb. 25, 1993 [DE] Germany ............................ 9302762 U

[51] Int. Cl.$^6$ ..................................................... B60J 7/047
[52] U.S. Cl. ........................... 296/223; 296/216; 296/220; 296/224
[58] Field of Search ................................ 296/216, 220, 296/223, 224

[56] References Cited

U.S. PATENT DOCUMENTS

| 4,403,805 | 9/1983 | Strem, Jr. et al. | 296/221 |
| 4,601,512 | 7/1986 | Boots | 296/221 |
| 4,609,222 | 9/1986 | Boots | 296/218 |
| 4,643,478 | 2/1987 | Boots | 296/221 |
| 4,647,105 | 3/1987 | Pollard | 296/221 |
| 4,699,421 | 10/1987 | Schaetzler et al. | 296/223 X |
| 4,741,572 | 5/1988 | Bauhof | 296/223 X |
| 4,982,995 | 1/1991 | Takahashi | 296/221 |
| 5,100,197 | 3/1992 | Ichinose et al. | 296/216 |
| 5,447,355 | 9/1995 | Kelm | 296/223 |

FOREIGN PATENT DOCUMENTS

| 3442615 | 10/1986 | Germany . |
| 3536184 | 11/1986 | Germany . |
| 3020675 | 1/1987 | Germany . |
| 3416176 | 5/1987 | Germany . |
| 3442631 | 2/1990 | Germany . |
| 3919385 | 7/1990 | Germany . |
| 3707644 | 11/1990 | Germany . |
| 4031750 | 5/1992 | Germany . |

*Primary Examiner*—Dennis H. Pedder
*Attorney, Agent, or Firm*—Vickers, Daniels & Young

[57] ABSTRACT

A device for adjusting the position of a sliding roof cover is provided. The cover is capable of moving in a sliding motion and can also be raised between a closed position and an open position relative to an opening in a roof. The device includes transportation carriages which permit sliding of the cover on guide rails. The transportation carriages are arranged on both sides of the opening in the roof. The device comprises a generally triangular shaped lifting lever which is pivotably mounted at the transportation carriage about a first pivot and pivotably connected to a connecting element at a second pivot. The lifting lever is connected to the cover by an intermediate lever, the intermediate lever is pivotably mounted to the lifting lever at a third pivot. The transportation carriage and the connecting element move relative to one another between the closed position and the open position of the cover and the connecting element extends laterally along the transportation carriage. Each of the first, second and third pivots are generally located at the corners of the triangular shaped lifting lever.

9 Claims, 4 Drawing Sheets

DEVICE FOR ADJUSTING THE POSITION OF A SLIDING ROOF COVER

This is a continuation of application Ser. No. 518,389, filed, Aug. 23, 1995, now abandoned, which is a continuation of Ser. No. 197,136 filed Feb. 17, 1994 (now U.S. Pat. No. 5,447,355), which, in turn, claims priority of German application Ser. No. G93 02762.1 filed on Feb. 25, 1993.

BACKGROUND OF THE INVENTION

The invention relates to a device for adjusting the position of a sliding roof [cover] which can be raised whereby the cover is capable of moving in a sliding fashion between the closed position and the opened position relative to an opening in the roof, whereby transportation carriages for the cover are located in a manner which permits sliding on guide rails which are arranged on both sides of the opening in the roof.

On opening and prior to sliding back from its closed position, the movable cover must be raised above the level of the fixed roof surface in the case of devices of this type for adjusting the position of a sliding roof [cover] which can be raised. The mechanism which is provided for this purpose does not only have to overcome the force of gravity on the cover—which, depending on the size and nature of the cover, can be considerable—but it must also surmount the sealing forces which hold the cover firmly in order to close off the roof if the device for adjusting the position of the sliding roof [cover], which can be raised, is not to remain closed.

The devices which have become known previously for lifting up a sliding roof [cover], which can be raised, are based on the use of guide slots and pegs with the help of which the cover is directed upward. For example, DE-3801881-C2 discloses a lifting device which has a front and a rear connecting guide for raising and lowering the cover. Connecting pegs with rollers engage with the slot there, as a result of which the path is defined for the displacement of the cover. Raising of the cover now takes place, in essence, via the feature that the connecting slots in the vertical projection are designed approximately in the shape of the letter S so that, on opening, the cover is guided upward as a result of movement of the connecting pegs. The force which is directed upward is generated by the vertical component of the movement.

Another form of embodiment is disclosed in EP-A-0 480 166 in which oblique positioning of a sun-roof is achieved by raising the cover on one side with the help of a lever. At its lower end, he lever is mounted in a manner which permits turning and engages, in each case, with connecting slots via laterally installed pegs in the center and at the upper end. The connecting slots are constructed in a simple linear fashion since upward movement of the cover is already engendered as a result of raising the lever.

To the extent that they are in any case capable of being used in conjunction with devices for adjusting the position of a sliding roof [cover] which can be raised, the adjustment devices which have become known previously all have the disadvantage in common, therefore, that frictional forces—which are generated as a result of the movement of pegs in connecting slots—have to be overcome on raising or, as the case may be, lifting up the cover from its closed position. In the case of devices with curved connecting slots, moreover, the force which is to be exerted depends on the ascent angle of the curve in the vertical direction; this leads, of necessity, to the feature that upward movement of the cover is associated with a relatively large horizontal movement. As a result, not only are the weight and the nature of the cover subjected to limitations but also its shape and size. Thus with conventional devices, a relatively thick cover of correspondingly [large] weight would, for example, be capable of being lifted above the level of the fixed roof only with the exertion of large forces. In the case of the mechanisms which are known, conversely, a relatively lighter cover can be guided firmly into the closed position only with difficulty in such a way that the roof is sealed off in a rain-proof manner.

SUMMARY OF THE INVENTION

The task which forms the basis of the invention is to provide an adjusting device which ensures easy opening and firm closing of a sliding roof [cover], which can be raised, in a manner which is independent of the size, weight and nature of the cover.

The task of the invention is accomplished by providing a device for adjusting the position of a sliding roof cover, capable of moving the roof cover in a sliding motion between a closed position and an open position relative to an opening in a roof. The device includes transportation carriages which permit sliding the cover on guide rails, the transportation carriages arranged on both sides of the opening in the roof. In a preferred embodiment, the device comprises a generally triangular shaped lifting lever pivotably mounted at the transportation carriage about a first pivot and pivotably connected to a connecting element at a second pivot. The lifting lever is connected to the cover by an intermediate lever, the intermediate lever pivotably mounted to the lifting lever at a third pivot. The transportation carriage and the connecting element move relative to one another between the closed position and the opened position of the cover and the connecting element extends laterally on the transportation carriage. Each of the first, second and third pivots are generally located at the corners of the triangular shaped lifting lever.

In order to raise the cover, the invention makes use of a lifting lever which is mounted in a manner that permits it to turn at a transportation carriage and which is connected to the cover via an intermediate lever. The upward movement of the cover is produced exclusively by turning moments about the points at which the lifting lever and the intermediate lever are pivoted. After raising the cover, it is slid back into the open position. On the other hand, a support ensures tight positioning of the cover in the closed position.

BRIEF DESCRIPTION OF THE DRAWINGS

A preferred example of an embodiment of the invention will be elucidated in more detail using the accompanying drawings. The following aspects are shown.

DETAILED DESCRIPTION OF THE INVENTION

Figure 1:
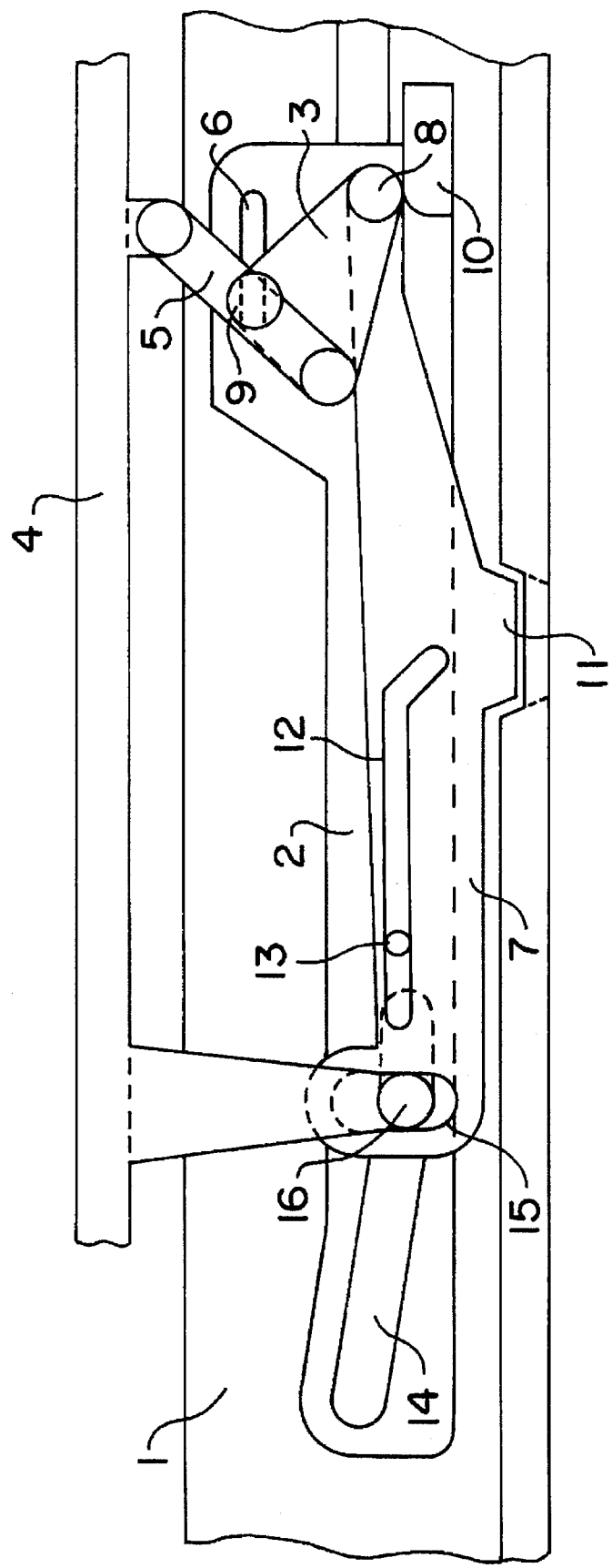
FIG. 1 shows a schematic lateral view of the adjusting device in accordance with the invention in the closed position of the cover.

The lateral view in FIG. 1 shows the position in which the mechanism is just moving out from the closed position or, as the case may be, it is just moving back into this position. Guide rails are installed in the frame 1 of the opening in the roof along which a transportation carriage 2 is capable of moving in a horizontal direction. In order to open the sliding roof [cover], which can be raised, the transportation carriage is moved toward the rear (to the right in the figure). Relative to this movement, a connecting element 7, which extends laterally along the transportation carriage 2, remains at rest initially. As a result, an articulated point 8 slides from a support 10 to below the transportation carriage 2 and releases a lifting lever 3. The lifting lever 3 is now capable of turning about the articulated point 8 which connects it to the transportation carriage 2. The lifting lever is additionally connected to the transportation carriage at a pivot 9. During this initial horizontal movement of the transportation carriage, the pivot 9 has moved in a parallel manner in an oblong hole 6. The pivot 6 is constructed in such a manner that rotational movement about this point is not possible as long as the articulated point 8 is still located on the support 10. As a result, the firm holding of the cover in the closed position is, on the one hand intensified, and, on the other hand, raising of the cover is assisted following the release of the lifting lever. The lifting lever has a shape which resembles a triangle i.e., is generally triangular shaped in which the first corner is defined by the articulated point 8, the second corner is defined by the pivot 9 and the third corner is defined by a point where rotation can occur at which the linear intermediate lever 5 is mounted by one end. It will be appreciated that articulated point (or pivot) 8, pivot 9 and the third corner where lever 5 is mounted are all pivots generally located at the corners of triangular shaped lifting lever 3. The other end of the intermediate lever is connected to the roof [cover] 4 in a manner which permits rotation.

Figure 2:
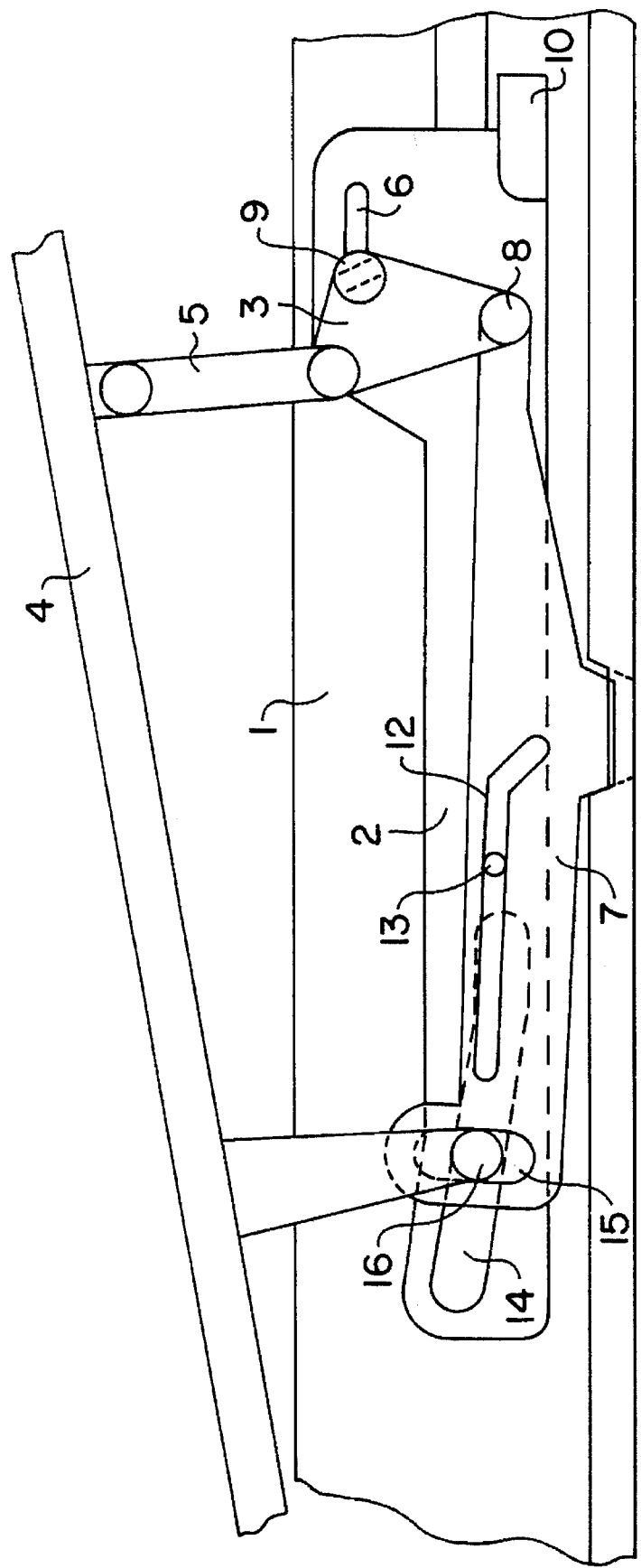
FIG. 2 shows a schematic lateral view of the adjusting device in accordance with the invention in the raised position of the cover.

If now—as has been shown in FIG. 2—the transportation carriage is drawn still further toward the rear (toward the right in the figure), then a turning moment about the pivot 9 is produced on the lifting lever 3 as a result of the feature that the pivot has reached the end of the oblong hole 6 and it is now carried along by the horizontal movement of the transportation carriage whereby, at the same time, the articulated point 8 is held firmly by the connecting element 7. The connecting element 7 itself does not participate in this initial horizontal movement, which serves to raise the cover, because it is restrained in its forward movement by a projection 11 which engages with an indentation in the frame of the roof. The projection and the indentation are constructed in such a way that they permit an easy tilting movement of the connecting element.

A peg 13 is provided at the transportation carriage 2 which engages in a connecting slot in the connecting element 7. If the transportation carriage is drawn back still further (toward the right in the figure), then the peg 13 arrives in a section of the connecting slot which is inclined downward whose vertical angle of inclination is arranged to be of such a magnitude that, as a result of further horizontal movement of the peg 13, the connecting element 7 is lifted up and the projection 11 is able to leave the indentation in the frame of the roof. As a result, the connecting element—and hence the entire mechanism—is capable of moving freely in a horizontal direction and the cover can be slid back completely.

Having been raised vertically, sliding roof cover 4 is capable of the above-mentioned sliding in the horizontal direction due to the pivoting peg 16 having arrived at the forward end of the transportation slot 14 of the transportation carriage 2. As will be appreciated, especially from FIG. 2, movement of the transportation carriage 2 backward in the horizontal direction causes the connecting element 7 and the pivoting peg 16 to remain relatively stationary in the horizonal direction until peg 13 has reached the declining portion of the connecting slot 12 and shifted the connecting element 7 around the articulated point 8 from a lower engagement position to an upper disengagement position of the projection 11 of the connecting element 7, engagement and disengagement being with respect to frame 1.

Figure 3:
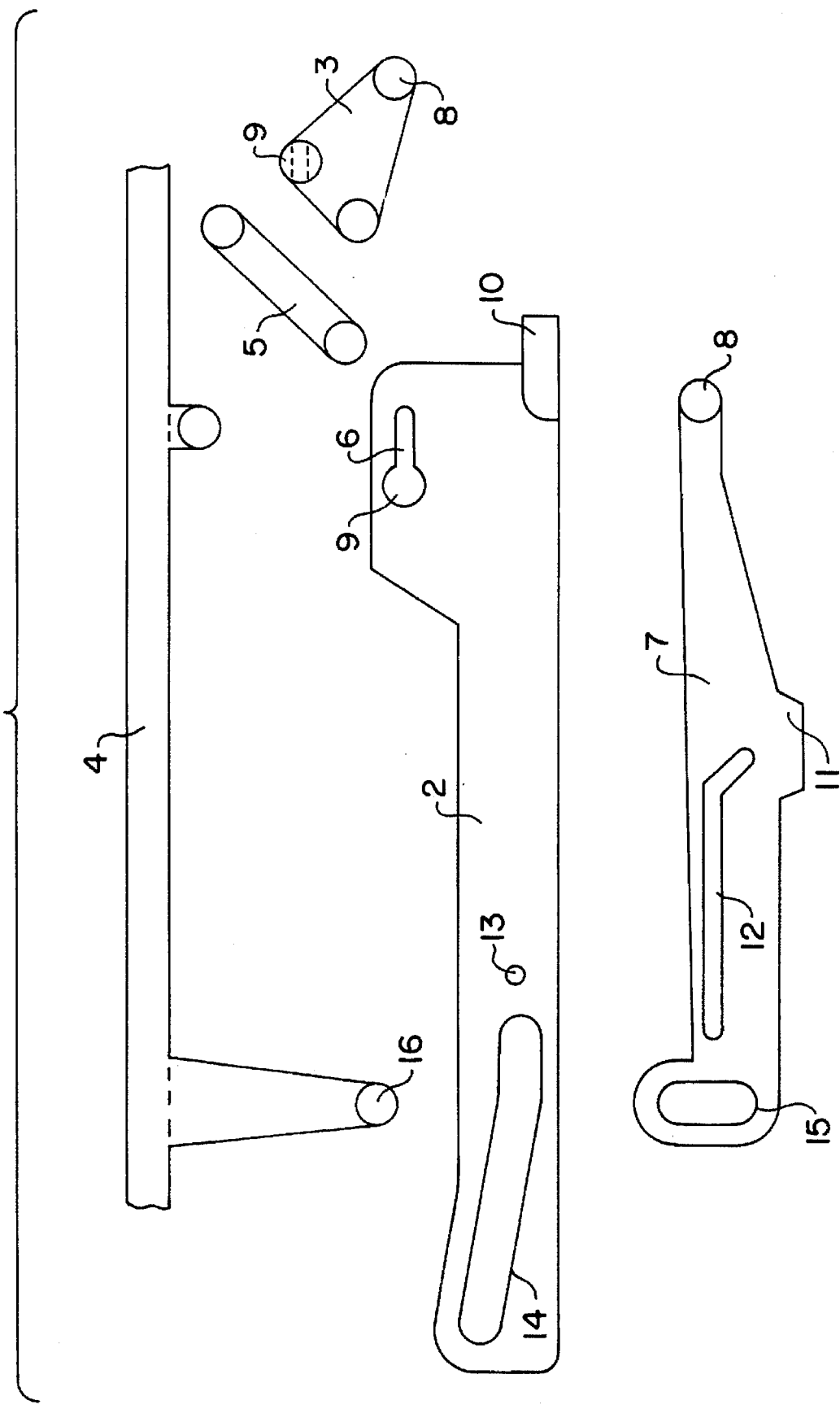
FIG. 3 shows a disassembled lateral view of the individual components of the adjusting device in accordance with the invention.
Figure 4:
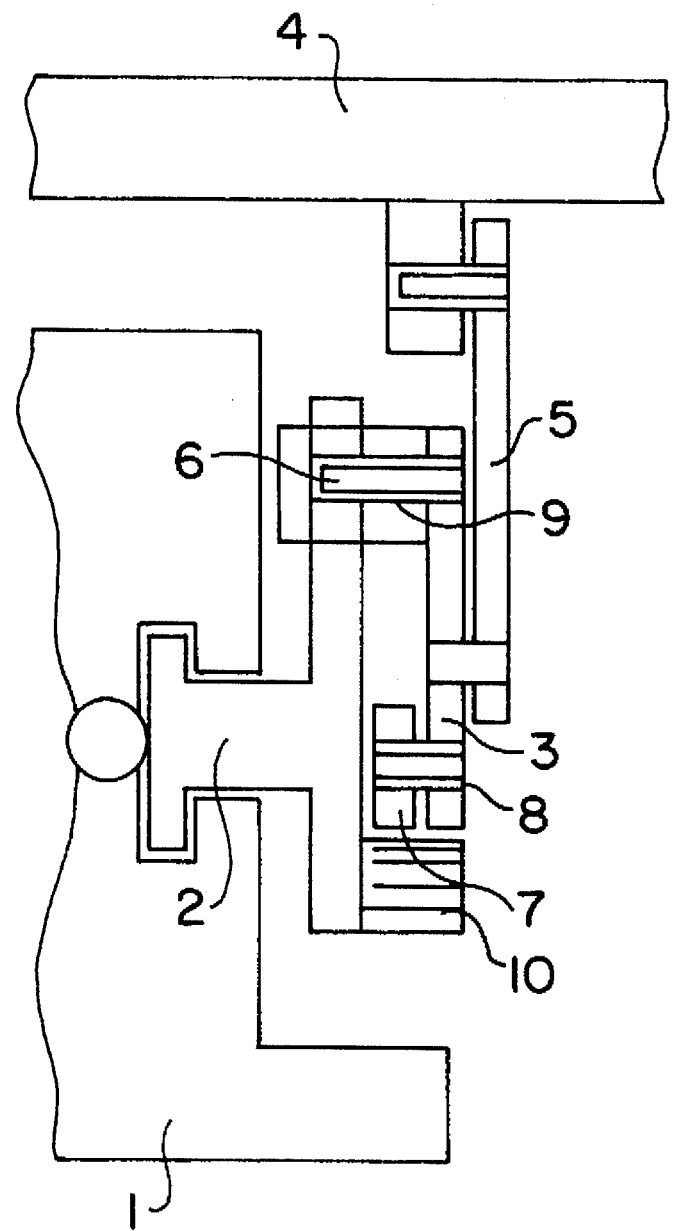
FIG. 4 shows a schematic front view of the adjusting device in accordance with the invention in the closed position of the cover.

The entire adjusting device comprises only four components, namely the transportation carriage 2, the lifting lever 3, the intermediate lever 5 and the connecting element 7. A sketch of the individual components and of the cover are shown in disassembled form in FIG. 3. The components are, in essence, constructed in a planar fashion and can, therefore, be accommodated in the frame of the roof [cover] in a manner which saves space.

I claim:

1. A device for adjusting the position of a sliding roof cover which can be raised, said cover capable of moving in a sliding motion between a closed position and an opened position relative to an opening in a roof including transportation carriages which permit sliding of said cover on guide rails, said transportation carriages arranged on both sides of the opening in said roof, said device comprising a generally triangular shaped lifting lever having three corners, said lifting lever pivotably mounted at said transportation carriage about a first pivot and pivotably connected to a connecting element at a second pivot, said lifting lever connected to said cover by an intermediate lever, said intermediate lever pivotably mounted to said lifting lever at a third pivot, said transportation carriage and said connecting element move relative to one another between said closed position and said opened position of said cover and said connecting element extending laterally along said transportation carriage, each of said first, second and third pivots generally located at the corners of said triangular shaped lifting lever.

2. Adjustment device in accordance with claim 1, including means for initially holding the connecting elements at rest relative to the direction of movement of the transportation carriages where the transportation carriages are moving in the opening direction.

3. Adjustment device in accordance with claim 2, including means for producing a slight tipping movement of said connecting elements relative to the direction of movement of said transportation carriages.

4. A device for adjusting the position of a sliding roof cover which can be raised, said cover capable of moving in a sliding motion between a closed position and an opened position relative to an opening in a roof including transportation carriages which permit sliding of said cover on guide rails, said transportation carriages arranged on both sides of the opening in said roof, said device comprising a lifting lever pivotably mounted at said transportation carriage about a pivot and pivotably connected to a connecting element, said lifting lever connected to said cover by an intermediate lever, said intermediate lever pivotably mounted to said lifting lever, said transportation carriage and said connecting element move relative to one another between said closed position and said opened position of said cover and said connecting element extending laterally along said transportation carriage, each said connecting element including a projection and a groove-like slot, each said groove-like slot comprising a horizontal section and an inclined section, each said transportation carriage including a pin which engages in said each groove-like slot.

5. Adjustment device in accordance with claim 1, including means for preventing rotary movement of said lifting lever until after initial horizontal movement of said transportation carriages.

6. Adjustment device in accordance with claim 1, wherein said transportation carriages are provided with at least one longitudinally extending opening for permitting movement of said triangular shaped lifting lever in a generally horizontal direction.

7. Adjustment device in accordance with claim 1, wherein said transportation carriages include supports on which said lifting lever and said connecting element lie when said cover is in the closed position.

8. A device for adjusting the position of a sliding roof cover which can be raised, said cover capable of moving in a sliding motion between a closed position and an opened position relative to an opening in a roof including transportation carriages which permit sliding of said cover on guide rails, said transportation carriages arranged on both sides of said opening in said roof, said device comprising means for vertically lifting said cover actuated by rotary movement of a generally triangular shaped lifting lever having three corners, said lifting lever pivotably mounted to said transportation carriage about a first pivot on said lifting lever and pivotably connected to a connecting element at a second pivot on said lifting lever, said lifting lever connected to an intermediate lever at a third pivot on said lifting lever, said intermediate lever pivotably mounted to said cover whereby said transportation carriage and said connecting element move relative to one another between said closed position and said opened position of said cover, said first, second and third pivots being generally located at the corners of said triangular shaped lifting lever.

9. A device for adjusting the position of a sliding roof cover which can be raised, said cover capable of moving in a sliding motion between a closed position and an opened position relative to an opening in a roof, said device including transportation carriages which permit sliding of said cover on guide rails, said transportation carriages arranged on both sides of the opening in said roof, said device comprising a single element lifting lever defined by three fixed pivots on said lifting lever said pivots being fixed with respect to each other in a triangular array, said lifting lever pivotably mounted at said transportation carriage about a first pivot on said lifting lever and pivotably connected to a connecting element at a second pivot on said lifting lever, said lifting lever connected to an intermediate lever at a third pivot on said lifting lever, said intermediate lever pivotably mounted to said cover whereby said transportation carriage and said connecting element move relative to one another between said closed position and said opened position of said cover.

* * * * *